United States Patent
Ito

(10) Patent No.: US 12,276,265 B2
(45) Date of Patent: Apr. 15, 2025

(54) WINDMILL AND WIND POWER GENERATION APPARATUS

(71) Applicant: NTN Corporation, Osaka (JP)

(72) Inventor: Takeru Ito, Kuwana (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 18/283,154

(22) PCT Filed: Mar. 10, 2022

(86) PCT No.: PCT/JP2022/010579
§ 371 (c)(1),
(2) Date: Sep. 20, 2023

(87) PCT Pub. No.: WO2022/202358
PCT Pub. Date: Sep. 29, 2022

(65) Prior Publication Data
US 2024/0167455 A1    May 23, 2024

(30) Foreign Application Priority Data
Mar. 22, 2021  (JP) .................... 2021-047221

(51) Int. Cl.
*F03D 9/25*    (2016.01)
*F03D 3/06*    (2006.01)

(52) U.S. Cl.
CPC .............. *F03D 9/25* (2016.05); *F03D 3/06* (2013.01); *F05B 2220/706* (2013.01)

(58) Field of Classification Search
CPC ........ F03D 9/25; F03D 3/06; F03B 2220/706; Y02E 10/74
See application file for complete search history.

(56) References Cited

U.S. PATENT DOCUMENTS 7,946,826 B1 * 5/2011 Koegler ............... F03D 1/0633
416/238
2012/0280510 A1    11/2012 Hwang
(Continued)

FOREIGN PATENT DOCUMENTS

EP          2518307 A1    10/2012
JP      2011089456 A  *   5/2011
(Continued)

OTHER PUBLICATIONS

English Translation JP-2011089456-A (Year: 2011).*
(Continued)

*Primary Examiner* — Shafiq Mian
(74) *Attorney, Agent, or Firm* — Rimon P.C.

(57) ABSTRACT

A windmill includes a shaft, a blade, and a supporting member. The windmill is rotatable about a center axis of the shaft. The blade has a blade main body portion extending along an axial direction that is a direction of the center axis. When viewed in a cross sectional view orthogonal to the axial direction, the blade main body portion includes a front edge and a rear edge, the front edge being an end on a front side in a rotation direction of the windmill, the rear edge being an end on a rear side in the rotation direction. The supporting member extends along a radial direction orthogonal to the axis direction and passing through the center axis, so as to connect the shaft and the blade main body portion to each other.

5 Claims, 5 Drawing Sheets

(56) References Cited

U.S. PATENT DOCUMENTS

| | | | |
|---|---|---|---|
| 2013/0259697 A1* | 10/2013 | Herrig | F03D 1/0633 |
| | | | 416/223 R |
| 2017/0096985 A1* | 4/2017 | Bardia | H02K 7/183 |
| 2018/0142673 A1 | 5/2018 | Wu et al. | |
| 2020/0208606 A1 | 7/2020 | Yamazawa | |
| 2021/0381486 A1 | 12/2021 | Juarez | |

FOREIGN PATENT DOCUMENTS

| | | |
|---|---|---|
| JP | 2011-169292 A | 9/2011 |
| JP | 5527783 B2 | 6/2014 |
| WO | 2019/045114 A1 | 3/2019 |
| WO | 2020/076824 A1 | 4/2020 |

OTHER PUBLICATIONS

International Search Report issued in International Application No. PCT/JP2022/010579 dated May 10, 2022 with English translation.

\* cited by examiner

WINDMILL AND WIND POWER GENERATION APPARATUS

CROSS REFERENCE TO RELATED APPLICATIONS

This application is the U.S. National Phase under 35 U.S.C. § 371 of International Application No. PCT/JP2022/010579, filed on Mar. 10, 2022, which claims the benefit of Japanese Application No. 2021-047221, filed on Mar. 22, 2021, and the entire contents of each are hereby incorporated by reference.

TECHNICAL FIELD

The present invention relates to a windmill and a wind power generation apparatus.

BACKGROUND ART

Japanese Patent Laying-Open No. 2011-169292 (PTL 1) describes a vertical type windmill for wind power generation. The vertical type windmill described in PTL 1 includes a rotation body, a blade (blade), and a horizontal supporting arm (supporting member). The rotation body is rotatable about a center axis. The blade has a main portion extending along a direction (axial direction) of the center axis of the rotation body. The supporting member extends in a direction (radial direction) orthogonal to the axial direction and passing through the center axis of the rotation body, so as to connect the main portion of the blade and the rotation body to each other. The supporting member has a substantially fish shape in a cross section orthogonal to the radial direction.

Japanese Patent No. 5527783 (PTL 2) describes a rotor for wind power generation. The rotor described in PTL 1 has a rotation shaft, a blade (blade), and a supporting base (supporting member). The rotation shaft is rotatable about a center axis. The blade extends along a direction (axial direction) of the center axis of the rotation shaft. The supporting member extends in a direction (radial direction) orthogonal to the axial direction and passing through the center axis of the rotation shaft, so as to connect the blade and the rotation shaft to each other. The supporting member has a streamline shape in a cross section orthogonal to the radial direction.

CITATION LIST

Patent Literature

PTL 1: Japanese Patent Laying-Open No. 2011-169292
PTL 2: Japanese Patent No. 5527783

SUMMARY OF INVENTION

Technical Problem

In each of the windmill described in PTL 1 and the rotor described in PTL 2, the cross sectional shape of the supporting member orthogonal to the radial direction is the substantially fish shape or the streamline shape, with the result that air resistance of the supporting member itself is reduced to improve rotation energy conversion efficiency. However, in each of the windmill described in PTL 1 and the rotor described in PTL 2, attention is not paid to disturbance of airflow at a connection portion between the supporting member and the blade. Therefore, each of the windmill described in PTL 1 and the rotor described in PTL 2 has room for improvement in terms of rotation energy conversion efficiency.

The present invention has been made in view of the above-described problem of the conventional art. More specifically, the present invention provides a windmill and a wind power generation apparatus so as to improve rotation energy conversion efficiency.

Solution to Problem

A windmill of the present invention includes a shaft, a blade, and a supporting member. The windmill is rotatable about a center axis of the shaft. The blade has a blade main body portion extending along an axial direction that is a direction of the center axis. When viewed in a cross sectional view orthogonal to the axial direction, the blade main body portion includes a front edge and a rear edge, the front edge being an end on a front side in a rotation direction of the windmill, the rear edge being an end on a rear side in the rotation direction. The supporting member extends along a radial direction orthogonal to the axial direction and passing through the center axis, so as to connect the shaft and the blade main body portion to each other. The supporting member has a front end and a rear end, the front end being an end on the front side in the rotation direction, the rear end being an end on the rear side in the rotation direction. A straight line that passes through an intermediate position between the front end and the rear end and that is parallel to the radial direction intersects a blade chord line on the rear edge side with respect to a midpoint of the blade chord line, the blade chord line connecting the front edge and the rear edge to each other.

In the windmill, the front end located at an end portion on the blade main body portion side is located on the rear edge side with respect to a position at which a distance from the rear edge is ⅔ of a length of the blade chord line in a direction of the blade chord line.

In the windmill, the straight line that passes through the intermediate position between the front end and the rear end and that is parallel to the radial direction may form an angle of less than 90° with respect to the blade chord line.

In the windmill, the front end located at an end portion on the blade main body portion side may be located on the rear edge side with respect to a center-of-gravity position of the blade main body portion in a direction of the blade chord line.

A wind power generation apparatus of the present invention includes the windmill and a power generator that generates power by rotation of the windmill about the center axis.

Advantageous Effects of Invention

According to the windmill and the wind power generation apparatus of the present invention, rotation energy conversion efficiency can be improved.

DESCRIPTION OF EMBODIMENTS

Figure 1:
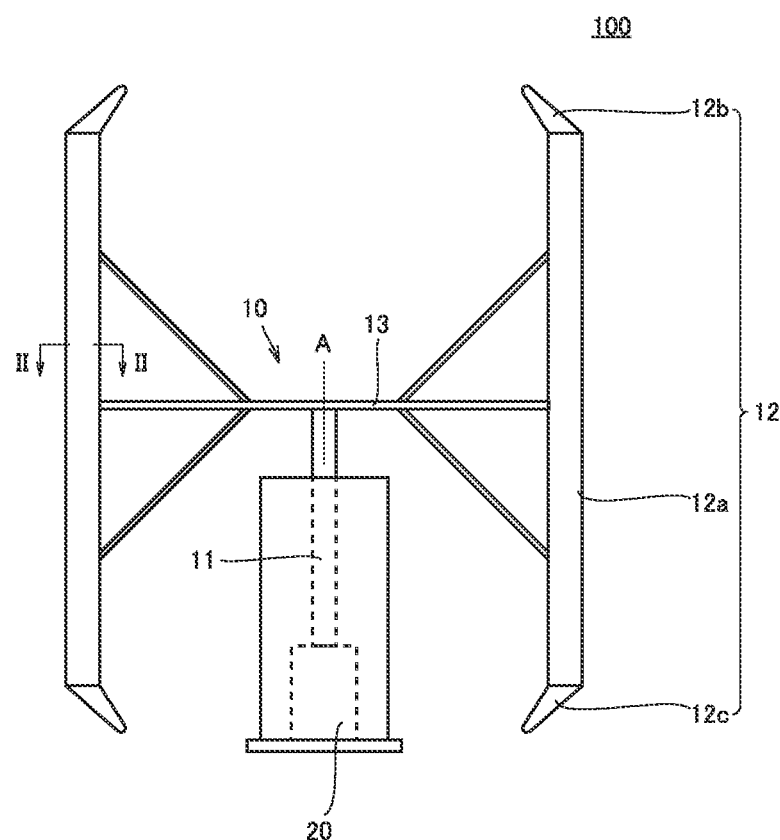
FIG. 1 is a front view of a wind power generation apparatus 100.

Embodiments of the present invention will be described in detail with reference to figures. In the figures described below, the same or corresponding portions are denoted by the same reference characters and the same explanation will not be described repeatedly.

Configuration of Wind Power Generation Apparatus According to Embodiment

A configuration of a wind power generation apparatus (hereinafter referred to as "wind power generation apparatus 100") according to a first embodiment will be described.

FIG. 1 is a front view of wind power generation apparatus 100. As shown in FIG. 1, wind power generation apparatus 100 has a windmill 10 and a power generator 20. Power generator 20 generates power with windmill 10 being rotated about a center axis A described later. Wind power generation apparatus 100 is attached on a supporting pillar (not shown) and is accordingly installed at an elevated position.

Windmill 10 is a vertical axis windmill (vertical type windmill). Windmill 10 has a shaft 11, blades 12, and a supporting member 13. The center axis of shaft 11 is referred to as center axis A. A direction of center axis A is defined as an axial direction. A direction orthogonal to the axial direction and passing through center axis A is defined as a radial direction. Windmill 10 is rotatable about center axis A. In the example shown in FIG. 1, windmill 10 has two blades 12 disposed at symmetrical positions with respect to center axis A. However, the number of blades 12 is not limited thereto.

Figure 2:
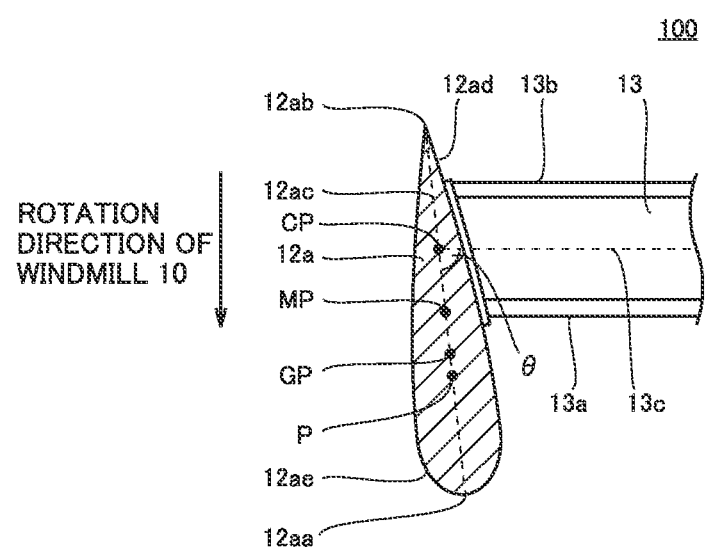
FIG. 2 is a cross sectional view at II-II of FIG. 1.

Shaft 11 extends in the axial direction. Shaft 11 is rotatable about center axis A. Each of blades 12 has a blade main body portion 12a, a blade end inclination portion 12b, and a blade end inclination portion 12c. Blade main body portion 12a extends along the axial direction. FIG. 2 is a cross sectional view at II-II of FIG. 1. As shown in FIG. 2, blade main body portion 12a has, for example, a lift type shape when viewed in a cross sectional view orthogonal to the axial direction.

When viewed in the cross sectional view orthogonal to the axial direction, blade main body portion 12a has a front edge 12aa and a rear edge 12ab. Front edge 12aa is an end of blade main body portion 12a on the front side in a rotation direction (indicated by an arrow in FIG. 2) of windmill 10. Rear edge 12ab is an end of blade main body portion 12a on the rear side in the rotation direction of windmill 10. An imaginary line connecting front edge 12aa and rear edge 12ab to each other is defined as a blade chord line 12ac. A direction of blade chord line 12ac is defined as a blade chord direction.

A point on blade chord line 12ac at an intermediate position between front edge 12aa and rear edge 12ab is defined as an intermediate position MP. A distance between intermediate position MP and front edge 12aa in the blade chord direction is equal to a distance between intermediate position MP and rear edge 12ab in the blade chord direction.

A center-of-gravity position of blade main body portion 12a when viewed in the cross sectional view orthogonal to the axial direction is defined as a center-of-gravity position GP. A width of blade main body portion 12a in a direction orthogonal to the blade chord direction is at maximum on the front edge 12aa side, and becomes smaller toward the rear edge 12ab side therefrom. Therefore, center-of-gravity position GP is located on the front edge 12aa side with respect to intermediate position MP in the blade chord direction. Center-of-gravity position GP may or may not be located on blade chord line 12ac. It should be noted that FIG. 2 shows an example in which center-of-gravity position GP is located on blade chord line 12ac.

A position at which a distance from rear edge 12ab in the blade chord direction is ⅔ of a blade chord length (length of blade chord line 12ac) is defined as a position P. Position P is located on the front edge 12aa side with respect to intermediate position MP and center-of-gravity position GP in the blade chord direction.

Blade main body portion 12a has an inner side surface 12ad and an outer side surface 12ae. Inner side surface 12ad is a surface of blade main body portion 12a facing the center axis A side (inner side in the radial direction). Outer side surface 12ae is a surface of blade main body portion 12a facing a side (outer side in the radial direction) opposite to center axis A. From another point of view, it can be said that outer side surface 12ae is a surface opposite to inner side surface 12ad in the radial direction.

As shown in FIG. 1, blade end inclination portion 12b is connected to one end (upper end) of blade main body portion 12a in the axial direction. Blade end inclination portion 12b extends upward from the upper end of blade main body portion 12a with blade end inclination portion 12b being inclined inward in the radial direction. Blade end inclination portion 12c is connected to the other end (lower end) of blade main body portion 12a in the axial direction. Blade end inclination portion 12c extends downward from the lower end of blade main body portion 12a with blade end inclination portion 12c being inclined inward in the radial direction.

Supporting member 13 extends along the radial direction. Since supporting member 13 extends along the radial direction, shaft 11 and blade 12 (blade main body portion 12a) are connected to each other. Supporting member 13 is connected to the inner side surface 12ad side of blade main body portion 12a. As shown in FIG. 2, supporting member 13 has a front end 13a and a rear end 13b when viewed in a plan view (when viewed along the axial direction). Front end 13a is an end of supporting member 13 on the front side in the rotation direction of windmill 10. Rear end 13b is an end of supporting member 13 on the rear side in the rotation direction of windmill 10.

A straight line that passes through an intermediate position between front end 13a and rear end 13b and that is parallel to the radial direction is defined as a straight line 13c. Straight line 13c and blade chord line 12ac intersect each other at an intersection point CP. Intersection point CP is located on the rear edge 12ab side with respect to intermediate position MP in the blade direction. Straight line 13c forms an angle θ with respect to blade chord line 12ac. Angle θ is, for example, less than 90°.

Front end 13a located at an end portion of supporting member 13 on the blade main body portion 12a side is located on the rear edge 12ab side with respect to position P in the blade chord direction. Preferably, front end 13a located at the end portion of supporting member 13 on the blade main body portion 12a side is located on the rear edge 12ab side with respect to center-of-gravity position GP in the blade chord direction.

Although not shown, when viewed in the cross sectional view orthogonal to the radial direction, supporting member 13 has, for example, a smooth shape such as a streamline shape or an ellipse.

Figure 3:
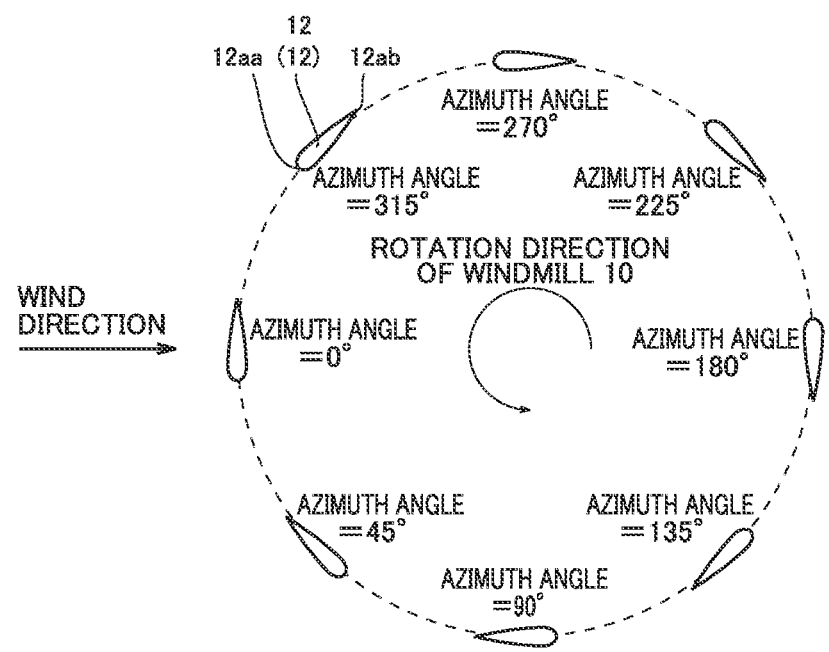
FIG. 3 is a schematic diagram showing a relation between an azimuth angle of a blade main body portion 12a and a wind direction.

FIG. 3 is a schematic diagram showing a relation between an azimuth angle of blade main body portion 12a and a wind direction. The azimuth angle of blade main body portion 12a is 0° when the wind direction is at 90° with respect to a direction from rear edge 12ab toward front edge 12aa. In the example of FIG. 3, the azimuth angle of blade main body portion 12a is increased as windmill 10 is rotated counterclockwise, and when windmill 10 has made one rotation, the azimuth angle of blade main body portion 12a returns to 0°.

Figure 4:
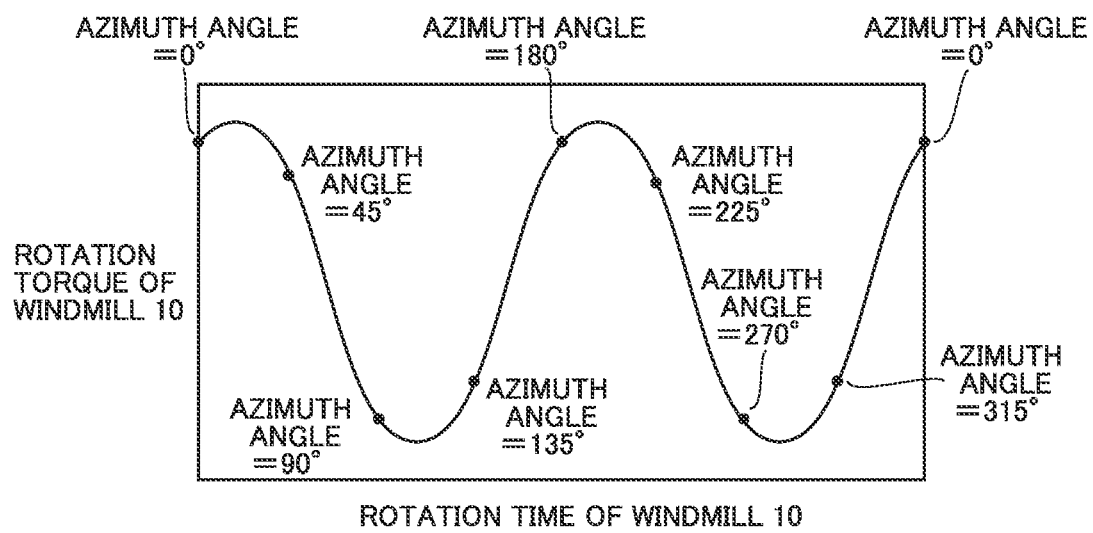
FIG. 4 is a schematic graph showing a relation between a rotation time of a windmill 10 and rotation torque applied to windmill 10 when there are two blades 12.

FIG. 4 is a schematic graph showing a relation between a rotation time of windmill 10 and rotation torque applied to windmill 10 when there are two blades 12. As shown in FIG. 4, the rotation torque applied to windmill 10 is at maximum when the azimuth angle of blade main body portion 12a is around 0°.

Effects of Wind Power Generation Apparatus According to Embodiment

Effects of wind power generation apparatus 100 will be described below in comparison with a wind power generation apparatus according to a comparative example (hereinafter referred to as "wind power generation apparatus 200").

Figure 5:
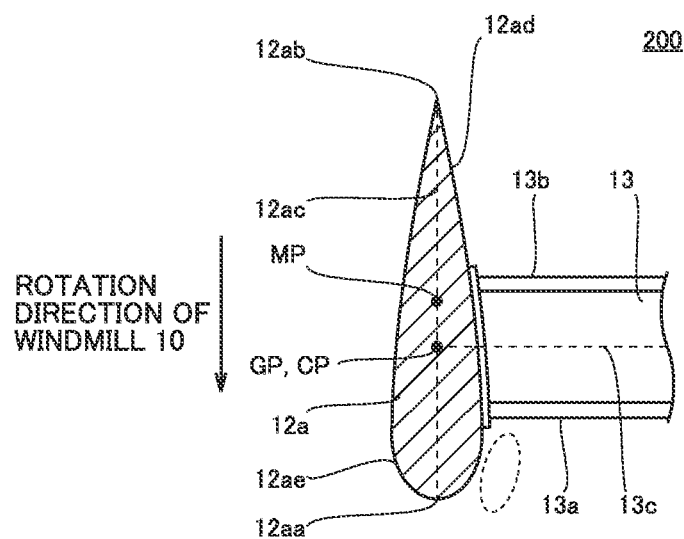
FIG. 5 is a cross sectional view of a wind power generation apparatus 200.

Wind power generation apparatus 200 has a windmill 10 and a power generator 20. FIG. 5 is a cross sectional view of wind power generation apparatus 200. FIG. 5 shows a cross section at a position corresponding to II-II in FIG. 1. As shown in FIG. 5, in wind power generation apparatus 200, windmill 10 has a shaft 11 (not shown in FIG. 5), blades 12, and a supporting member 13. In these respects, the configuration of wind power generation apparatus 200 is the same as the configuration of wind power generation apparatus 100.

However, in wind power generation apparatus 200, center-of-gravity position GP is located on straight line 13c. In other words, in wind power generation apparatus 200, intersection point CP between straight line 13c and blade chord line 12ac is located on the front edge 12aa side with respect to intermediate position MP. In this respect, the configuration of wind power generation apparatus 200 is different from the configuration of wind power generation apparatus 100. It should be noted that in wind power generation apparatus 200, straight line 13c and blade chord line 12ac form, for example, a right angle.

In wind power generation apparatus 200, since center-of-gravity position GP is located on straight line 13c, centrifugal force applied to blade 12 (blade main body portion 12a) can be readily supported by supporting member 13. However, in wind power generation apparatus 200, there is room for improvement in terms of rotation energy conversion efficiency.

More specifically, rotation force of windmill 10 is generated mainly by a negative pressure generated in the surroundings of inner side surface 12ad (region indicated by a dotted line in FIG. 5; hereinafter referred to as "negative pressure generation region") in the vicinity of front edge 12aa. In wind power generation apparatus 200, since supporting member 13 is connected to blade main body portion 12a such that center-of-gravity position GP is located on straight line 13c, the position of the connection portion between supporting member 13 and blade main body portion 12a is close to the negative pressure generation region. At the connection portion between supporting member 13 and blade main body portion 12a, disturbance of airflow is likely to occur. The disturbance of airflow interferes with an airflow flowing in the negative pressure generation region, with the result that the airflow flowing in the negative pressure generation region is separated from inner side surface 12ad to decrease the rotation force of windmill 10.

On the other hand, since intersection point CP between straight line 13c and blade chord line 12ac is located on the rear edge 12ab side with respect to intermediate position MP in wind power generation apparatus 100, the connection portion between supporting member 13 and blade main body portion 12a can be located away from the negative pressure generation region in wind power generation apparatus 100, with the result that the disturbance of airflow generated at the connection portion between supporting member 13 and blade main body portion 12a is less likely to interfere with the negative pressure generation region. Thus, according to wind power generation apparatus 100, the rotation force of windmill 10 can be suppressed from being decreased due to the disturbance of airflow generated at the connection portion between supporting member 13 and blade main body portion 12a, thereby improving the rotation energy conversion efficiency.

When front end 13a located at the end portion of supporting member 13 on the blade main body portion 12a side is located on the rear edge 12ab side with respect to position P (or center-of-gravity position GP) in the blade chord direction in wind power generation apparatus 100, the connection portion between supporting member 13 and blade main body portion 12a can be located further away from the negative pressure generation region, thereby further improving the rotation energy conversion efficiency.

When the angle (angle θ) formed by straight line 13c and blade chord line 12ac is less than 90° in wind power generation apparatus 100, rotation trajectories of front edge 12aa and rear edge 12ab can be disposed on the same diameter, thereby attaining a small projected area when viewed from a lateral side of blade main body portion 12a. Therefore, in this case, rotation resistance of windmill 10 can be reduced, thereby improving the rotation energy conversion efficiency.

Although the embodiment of the present invention has been described above, the embodiment described above can be modified in various manners. The scope of the present invention is not limited to the above-described embodiment. The scope of the present invention is defined by the terms of the claims, and is intended to include any modifications within the scope and meaning equivalent to the terms of the claims.

INDUSTRIAL APPLICABILITY

The above-described embodiment is particularly advantageously applied to a vertical axis windmill and a wind power generation apparatus having the vertical axis windmill.

REFERENCE SIGNS LIST

10: windmill; 11: shaft; 12: blade; 12a: blade main body portion; 12aa: front edge; 12ab: rear edge; 12ad: inner side surface; 12ae: outer side surface; 12b: blade end inclination portion; 12c: blade end inclination portion; 13: supporting member; 13a: front end; 13b: rear end; 13c: straight line; 20: power generator; 100, 200: wind power generation apparatus; A: center axis; CP: intersection point; GP: center-of-gravity position; MP: intermediate position; P: position.

The invention claimed is:

1. A windmill comprising a shaft, a blade, and a supporting member, wherein
the windmill is rotatable about a center axis of the shaft,
the blade has a blade main body portion extending along an axial direction of the center axis,
in a cross-sectional view orthogonal to the axial direction, the blade main body portion includes a front edge and a rear edge, the front edge being disposed at a leading end of the blade main body portion in a rotation direction of the windmill, the rear edge being disposed at a trailing end of the blade main body portion in the rotation direction,
the supporting member extends along a radial direction orthogonal to the axial direction and passing through the center axis, so as to connect the shaft and the blade main body portion to each other,
the supporting member has a front end and a rear end, the front end being disposed at a leading end of the supporting member in the rotation direction, the rear end being disposed at a trailing end of the supporting member in the rotation direction,
a straight line passes through an intermediate position between the front end and the rear end of the supporting member and is parallel to the radial direction,
a blade chord line connects the front edge and the rear edge of the blade main body portion, with a midpoint being located equidistant from the front edge and the rear edge of the blade main body portion,
the straight line intersects the blade chord line at a position closer to the rear edge of the blade main body portion than the midpoint of the blade chord line, and
the rear end of the supporting member meets the blade main body portion at a position on the blade main body portion that is offset from the rear edge of the blade main body portion in a direction along the blade chord line.

2. The windmill according to claim 1, wherein the front end of the supporting member meets the blade main body portion at a position on the blade main body portion that is ⅔ of a length of the blade chord line offset from the rear edge in the direction along the blade chord line.

3. The windmill according to claim 1, wherein the straight line forms an angle of less than 90° with respect to the blade chord line.

4. The windmill according to claim 1, wherein the front end of the supporting member meets the blade main body portion side is at a position located on a rear edge side with respect to a center-of-gravity position of the blade main body portion in the direction of the blade chord line.

5. A wind power generation apparatus comprising:
the windmill according to claim 1; and
a power generator that generates power by rotation of the windmill about the center axis.

* * * * *